(12) United States Patent
Nikolai et al.

(10) Patent No.: US 7,255,472 B2
(45) Date of Patent: Aug. 14, 2007

(54) MIXING DEVICE WITH MIXING RING HAVING OFFSET CHANNELS WITH SPACED BAFFLES

(75) Inventors: Hartmut Nikolai, Meckenheim (DE); Ernst-Jürgen Grittmann, Ludwigshafen (DE)

(73) Assignee: BASF Aktiengesellschaft (DE)

( * ) Notice: Subject to any disclaimer, the term of this patent is extended or adjusted under 35 U.S.C. 154(b) by 143 days.

(21) Appl. No.: 10/530,930

(22) PCT Filed: Oct. 14, 2003

(86) PCT No.: PCT/EP03/11371

§ 371 (c)(1),
(2), (4) Date: Apr. 11, 2005

(87) PCT Pub. No.: WO2004/035282

PCT Pub. Date: Apr. 29, 2004

(65) Prior Publication Data
US 2006/0164911 A1   Jul. 27, 2006

(30) Foreign Application Priority Data
Oct. 21, 2002   (EP)   .................................. 02023466

(51) Int. Cl.
B29C 47/64   (2006.01)
(52) U.S. Cl. ...................................................... 366/82
(58) Field of Classification Search ............ 366/78–82, 366/88–90, 285, 289; 425/207, 209, 559, 425/562
See application file for complete search history.

(56) References Cited
U.S. PATENT DOCUMENTS 4,128,342 A * 12/1978 Renk ........................... 366/99
4,253,771 A * 3/1981 Renk ........................... 366/89
4,447,156 A * 5/1984 Csongor ...................... 366/80
4,749,279 A * 6/1988 Csongor ...................... 366/80
4,779,989 A * 10/1988 Barr ............................ 366/90
5,158,784 A * 10/1992 Semmekrot ................. 425/208

(Continued)

FOREIGN PATENT DOCUMENTS

DE   27 22 933   11/1978

(Continued)

Primary Examiner—Charles E. Cooley
(74) Attorney, Agent, or Firm—Connolly Bove Lodge & Hutz, LLP

(57) ABSTRACT

A device comprising a shaft, a front ring connected to this shaft, an end ring connected to the shaft at a distance A from the front ring, and a loose mixing ring, which is freely rotatable and located between the front ring and the end ring. The mixing ring has a first region in which its inside diameter is large enough for it to be able to overlap with a region of smaller diameter of the front ring has an adjoining region in which the mixing ring has on its inner side at least two channels (4k) which run axially parallel, at an angle in relation to the axis of the shaft or helically thereto, and also an adjoining third region in which its inside diameter is large enough for it to be able to overlap with a region of smaller diameter of the end ring and the mixing ring is so long that, in its respective end positions, the other of the two rings respectively is partially overlapped by the mixing ring. The mixing ring channels are offset in relation to each other.

9 Claims, 5 Drawing Sheets

U.S. PATENT DOCUMENTS

| | | | | |
|---|---|---|---|---|
| 5,988,866 A | * | 11/1999 | Barr | 366/80 |
| 6,254,266 B1 | * | 7/2001 | Barr et al. | 366/82 |
| 6,709,147 B1 | * | 3/2004 | Rauwendaal | 366/80 |
| 7,033,163 B2 | * | 4/2006 | Wurtele | 425/559 |
| 2006/0164911 A1 | * | 7/2006 | Nikolai et al. | 366/82 |

FOREIGN PATENT DOCUMENTS

| | | | |
|---|---|---|---|
| DE | 100 00 938 | | 7/2000 |
| EP | 0 048 590 | | 3/1982 |
| EP | 0 219 334 | | 4/1987 |
| EP | 0 340 873 | | 11/1989 |
| EP | 1 000 656 | | 5/2000 |
| JP | 50-90117 | | 7/1975 |
| JP | 2-63538 | * | 3/1990 |

* cited by examiner

Figure 1
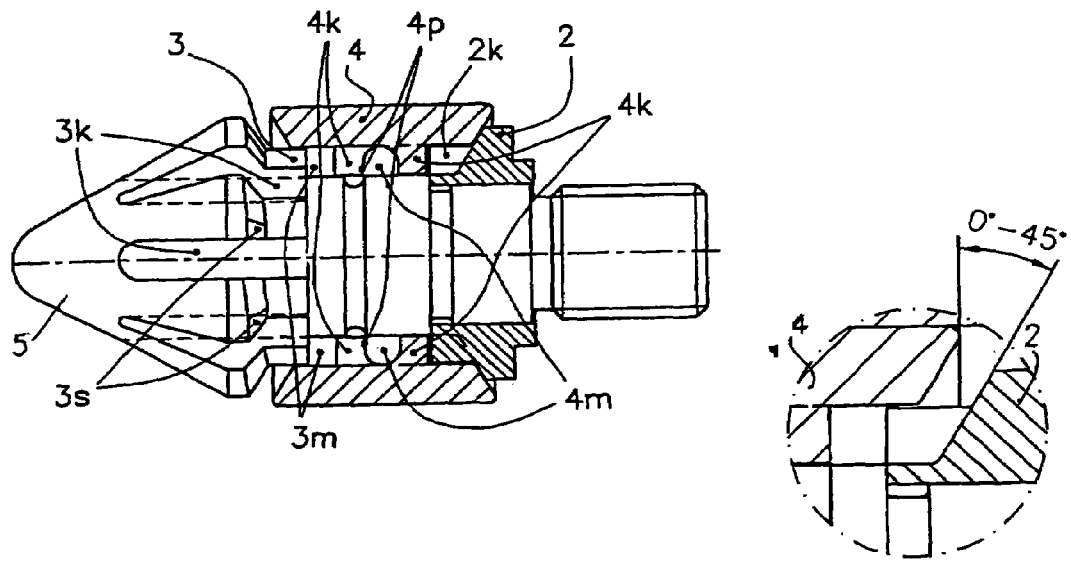
Figure 2
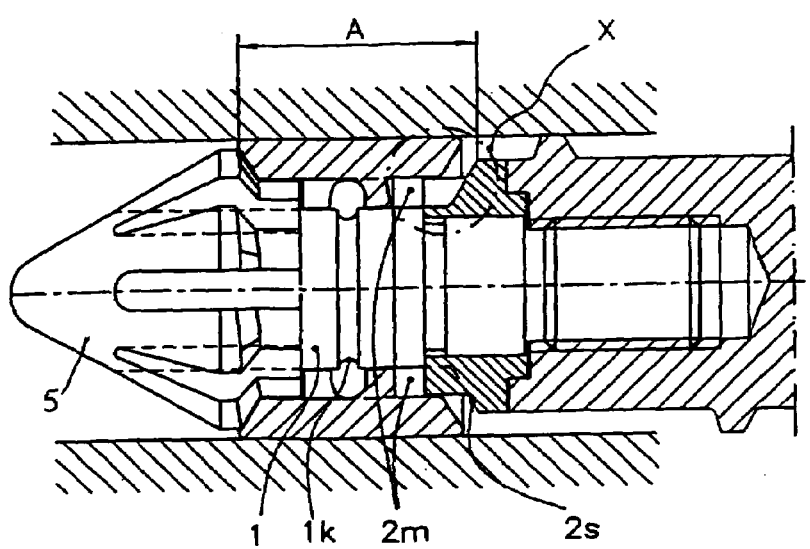
Detail X
Figure 2A

MIXING DEVICE WITH MIXING RING HAVING OFFSET CHANNELS WITH SPACED BAFFLES

RELATED APPLICATIONS

This application is a national stage application (under 35 U.S.C. 371) of PCT/EP2003/011371 filed Oct. 14, 2003 which claims benefit to European Patent Application 02023466 filed Oct. 21, 2002.

BACKGROUND OF THE INVENTION

1. Field of the Invention

The present invention relates to a mixing device which comprises a shaft (1), a front ring (2), which is positively and non-positively connected to this shaft, an end ring (3), which is positively and non-positively connected to the shaft at a distance A from the front ring, and a loose mixing ring (4), which is freely rotatable and can be moved back and forth between the front ring and the end ring.

2. Description of Related Art

Devices for mixing polymer melts are known from the prior art.

For instance, DE-A 100 00 938 discloses a mixing device in which an assembly of mixing rings and dividing rings joined, alternately one behind the other has been pulled onto a rotor. The mixing rings have grooves, the dividing rings have bores. If melt passes over from the mixing grooves to the bores, it is deflected and divided and is mixed in this way. A similar principle is disclosed in EP-A1 1 000 656, with the difference that some of the rings of the ring assembly are freely rotatable. Both devices have the disadvantage that, on the one hand, they are structurally complex, susceptible to wear and difficult to clean and, on the other hand, high pressures are required to force the melt through the bores.

EP-A 48590 discloses an extruder mixer comprising a rotor and a stator, both the rotor and the stator having rows of semicircular cavities. The cavities of the rotor and stator do not lie one over the other but are offset somewhat with respect to one another. As a result, the extruded material is not only sheared but also divided and rotated. This device too is structurally complex and, furthermore, has the disadvantage that the mixing effect is only sufficient for practical requirements with relatively long stators. In addition, when these stators are used in an injection-molding machine, a non-return valve must be additionally fitted, since the mixing device itself is not suitable for preventing the melt from flowing back.

EP-B1 219 334 relates to a cavity transfer mixing extruder which comprises a stator and a rotor and is distinguished by the fact that both the stator and the rotor have two cavity groups. These cavity groups are aligned with each other in the form of a parallelogram when they are projected onto a plane and, furthermore, are characterized by their angles of inclination. This mixing device is disadvantageous because, like the device referred to in EP-A 48590, this device is expensive to produce and its mixing effect depends on the length of the stator.

JP 50-90117 discloses a mixing device for injection-molding machines which operates in the manner of a non-return valve. The mixing device in this case comprises two rings, one being screwed onto the screw shaft and the other being arranged movably over it. Both parts have channels, which are arranged in such a way that they overlap and the melt is transferred from one channel directly into the other. The mixing effect of this device is not adequate for many applications.

In the patent EP-B1 340 B73, a mixing device for an extruder or an injection-molding machine is described. This device has a separate mixing ring, arranged for free rotation about a rotor. The rotor is arranged in a stator. The mixing ring is distinguished by the fact that it has mixing passages, which extend from the inner surface of the stator to the outer surface of the rotor. In other words, the mixing ring has holes. The mixing device according to EP-B1 340 B73 can assume the function of a non-return valve for injection-molding machines. The mixing device disclosed in the patent has the disadvantage that the melt transport is not ensured sufficiently well for all applications. On the other hand, the mixing device does not provide an adequately good seal when it is used as a non-return valve. In addition, the mixing effect is only at its optimum when the mixing device has a certain minimum length. The minimum length is about twice the screw diameter 2D. Therefore, this mixing device cannot be adapted to every extruder or every injection-molding machine, but instead the machines must be specifically converted for this purpose, that is to say the screw must be shortened. Since the mixing device must have a certain minimum length, the melt volume that is constantly present in the mixing device is also relatively great. This means that, for example when changing colors, relatively considerable time and material is required before usable parts of the new color are obtained. On account of the fact that the mixing ring is provided with holes, it also has the disadvantage that it is mechanically weakened. The shorter the ring, the more acute this disadvantage, making it highly susceptible to wear.

SUMMARY OF THE INVENTION

It was an object of the present invention to provide a device which is suitable for mixing purposes and use in screw machines, and which does not have the disadvantages of the known mixing devices. In particular, it should be easy to produce. Furthermore, it should be designed in such a way that it is as immune as possible to malfunctions, can withstand loading and undergoes little wear. A further aim was to find a device which allows itself to be fitted and removed easily in very different screw machines, without complex adaptation of the screw machines themselves to the mixing device being required. The mixing device was also intended to meet the requirement of being easy to clean.

To achieve this object, a mixing device is proposed with the characterizing features:

that the front ring and the end ring in each case have at least one channel (2k) or (3k), respectively, which runs axially parallel (axially), at an angle in relation to the axis of the shaft or helically, and has in each case at least two regions of different outside diameters, of which the region with the smaller outside diameter is respectively located on the side facing the mixing ring, and the mixing ring has a first region in which its inside diameter is large enough for it to be able to overlap with the region of smaller diameter of the front ring has an adjoining region in which the mixing ring has on its inner side at least one channel (4k) which runs axially parallel (axially), at an angle in relation to the axis of the shaft or helically, and also an adjoining third region in which its inside diameter is large enough for it to be able to overlap with the region of smaller diameter of the end ring and the mixing ring is so long that, in its respective end positions, the other of the two rings (2) or (3) respectively is partially overlapped.

On account of its little resistance of wear and low susceptibility to malfunctions, such a mixing device allows a screw machine to be operated with a long service life. If desired, such a mixing device can be installed in various screw machines in a simple manner.

Such a mixing device also allows, for example, a rapid exchange of the melt to be ensured, to be able to minimize as much as possible the wastage that occurs, for example, when changing colors. It also allows the color of an injection-molded part to be influenced.

BRIEF DESCRIPTION OF THE DRAWINGS

FIG. 1 is an elevational view partly in section of a mixing device in accordance with this invention in the manner of a non-return valve in its closed position during the injection operation;

FIG. 2 is a view similar to FIG. 1 in the conveying position;

FIG. 2A is a view of Detail X shown in FIG. 2;

FIG. 4B is a showing of Detail Y of FIG. 4A illustrating a modified form of shaft which has a smooth surface;

DESCRIPTION OF THE PREFERRED EMBODIMENTS

Figure 3:
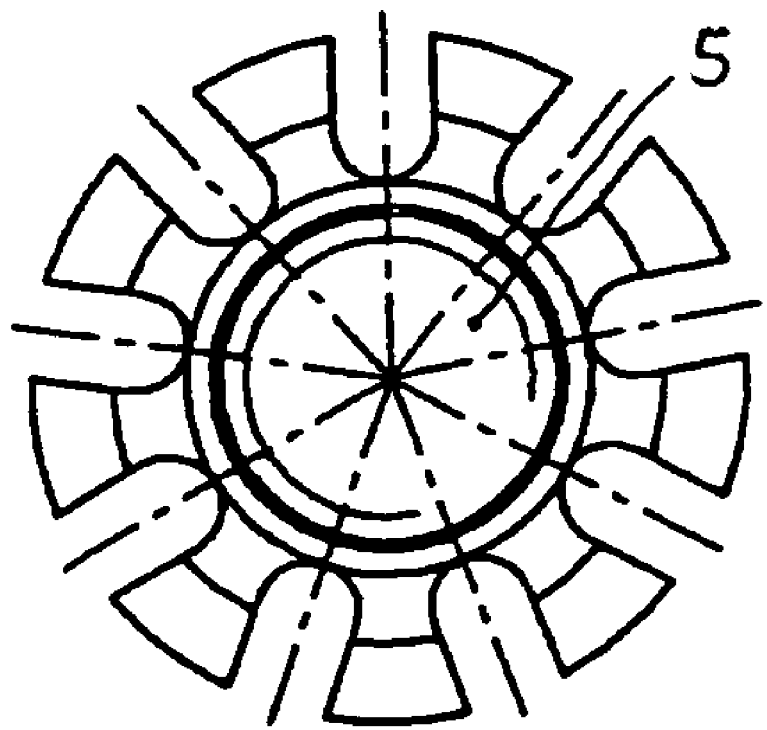
FIG. 3 is a plan view of the screw tip shown in FIGS. 1-2.

The mixing device according to the invention in described in more detail below.

Shaft (1)

The shaft (1) of the mixing device according to the invention can in principle be freely selected and adapted to the requirements, ouch as the type of material or amount of material to be mixed and the desired throughput. It may be round or have some other shape, for example be oval. It is generally round. Its diameter is likewise freely selectable and is generally adapted to the size of the screw machine in which the mixing device according to the invention is to be fitted. It goes without saying that it would similarly be conceivable, if not preferred, to adapt the screw machine to the diameter of the shaft of the mixing device according to the invention. The length of the shaft likewise depends on the requirements and is otherwise in principle freely selectable. The surface of the shaft may be smooth in the region of the section between the front ring (2) and the end ring (3) (FIG. 4B) or else have at least one, for example two or three or even more, circumferential channels (1k) on the section between the front ring and the end ring. The number of circumferential channels (1k) depends on the one hand on the intended mixing effect, on the other hand on the type and amount of material. The surface of the shaft is preferably either smooth or has a circumferential channel (1k). The cross-sectional shape of the circumferential channel or of the circumferential channels is itself freely selectable, with forms that are favorable for flow being preferred. For instance, it may be V-shaped, U-shaped, annular or rectangular. If more than one circumferential channel is used, it is also conceivable for the circumferential channels to have different cross-sectional shapes. It is particularly preferred for all the circumferential channels to be U-shaped. If more than one circumferential channel is used, they are preferably uniformly distributed over the surface of the shaft.

The mixing device according to the invention is preferably connected on one or in particular on both sides to two further devices. For this purpose, the shaft is generally shaped in such a way that, at least on the side on which the front ring is located, it has a means which makes it possible to connect the mixing device according to the invention to a further device. The shaft preferably also has on the side on which the end ring is located a means with which the mixing device according to the invention can be connected to an adjacent device. The connection is preferably achieved by means of a thread. It is possible, however, to establish the connection by welding, shrink-fitting, splining or interlocking. Examples which may be mentioned of devices to which the mixing device according to the invention can be connected are screw elements, such as the screw tip, kneading element, conveying element, shearing element, venting element or feed zone. Such devices are known to a person skilled in the art or can be produced from aspects known to a person skilled in the art and adapted to the requirements.

It is particularly preferred for the shaft to be connected on the side on which the front ring is located to a plasticizing screw and on the side on which the end ring is located to a screw tip (5).

Front Ring (2) and End Ring (3)

According to the invention, a front ring (2) and an end ring (3) are connected positively and non-positively (fixedly) to the shaft. The rings (2) and (3) may in this case be connected releasably or non-releasably to the shaft. It is also conceivable for one of the two rings to be connected releasably and one to be connected non-releasably to the shaft. It is advantageous and preferred for both the front ring and the end ring to be releasably connected to the shaft. The rings may consequently be bolted, braced, splined, interlocked or pressed on. In this case, the front ring and the end ring may be connected to the shaft in the same way or else in different ways. In this respect, it is particularly preferred to brace the front ring to the shaft and connect the end ring non-releasably to the shaft.

According to the invention, the front ring and the end ring are connected to the shaft at the distance A from each other. In this case, the distance A is the distance from the highest point of the front ring to the highest point of the end ring, i.e. the point at which the shoulder 2s or 3s, respectively, reaches the greatest outside diameter of 2 or 3. The distance A can in principle be freely selected, so that it in adapted to the needs of the individual case and intended application. For most applications, it is expedient for the distance A to be relatively short, whereby the device according to the invention is particularly well suited as the tip of a screw or can be used as a non-return valve in an injection-molding machine. For example, it may be recommendable to select a small distance A, if as little material as possible is to be located in the mixing device at any time. According to one of the preferred embodiments, the distance A lies in the range from 10 mm to 200 mm, particularly preferably in the range from 15 mm to 150 ma, in particular in the range from 20 mm to 80 mm.

According to the invention, both the front ring (2) and the end ring (3) in each case have at least one channel (2k) or (3k), respectively. They may also have in each case more than one channel (2k) or (3k), for example two or three or even more, for example up to 50. In this case, it is possible for the front ring and the end ring to have the same or a different number of channels (2k) or (3k). The channels (2k) or (3k) may run axially parallel (axially) or at an angle in relation to the axis of the shaft or helically, for example spirally. It is particularly preferred for them to run axially parallel in relation to the axis of the shaft (axially). The number, cross-sectional shape and arrangement of the channels (2k) or (3k) depends on the conditions. For example, a higher number may be advantageous if the mixing effect is to be great. It is particularly preferred for the front ring and the end ring to have the same number of channels (2k) and (3k) and it is preferred for the number of channels (2k) or (3k) to lie in the range from 4 to 25. The channels preferably have a cross-sectional shape that is favorable for flow. They may, for example, be V-shaped, U-shaped, annular or rectangular. If more than one channel is used, it is also conceivable for the channels to have different cross-sectional shapes. It is particularly preferred for all the channels to be U-shaped. The depth of the channels depends on the design conditions, it being advantageous that the stability of the rings should not be impaired.

The front ring (2) and the end ring (3) in each case have at least one region with a greater outside diameter and a second region with a smaller outside diameter. The two regions of the front ring or of the end ring may merge continuously one into the other and form a shoulder. Alternatively, they may, however, also merge in a stepped manner one into the other, so that between the region with the smallest outside diameter and the region with the greatest outside diameter there are regions which have an outside diameter of a size in between. So there may be one or two or more regions between the region with the smallest outside diameter and the region with the greatest outside diameter. It is particularly preferred for the two regions to merge continuously one into the other and to form a shoulder. In particular, the shoulder has an angle a of 0 to 45°. The size of the greatest outside diameter and the size of the smallest outside diameter are generally determined by the inside diameter of the screw (screw root surface) and the inside diameter of the mixing ring (4). According to the invention, the second region with the smaller outside diameter is respectively located on the side facing the mixing ring. The configuration of the front ring and the end ring on the side facing away from the mixing ring is only significant for the function of the mixing device according to the invention to the extent that it must not disturb this function. For example, it may have a step or a shoulder. The respective averted side of the rings (2) and (3) is expediently shaped in general in such a way that the mixing device according to the invention can be connected positively and non-positively to a further device. The front ring and the end ring may be configured in such a way that they have a different shape and size. They may, however, also have the same size and in fact the same shape and differ only in that they are mirror-inverted.

Mixing Ring (4)

According to the invention, the mixing device according to the invention comprises a mixing ring (4). The latter is loose and freely rotatable and is located such that it can be moved back and forth between the front ring and the and ring.

The mixing ring has a first region in which its inside diameter is large enough for it to be able to overlap with the smaller diameter region of the front ring.

The first region of the mixing ring is adjoined by a second region in which the mixing ring has on its inner side at least one channel (4k) which runs axially parallel (axially), at an angle in relation to the axis of the shaft, or helically, for example spirally, particularly preferably axially parallel (axially). In this region, the mixing ring may, however, also have more than one channel (4k). For example, it may have two or three or more channels (4k), for example up to 50. The number of channels (4k) generally lies in the range from 4 to 20. It is particularly preferred for at least one of the channels (4k) to ran axially parallel (axially). In particular, it is preferred for all the channels (4k) to run axially parallel (axially). According to one of the particularly preferred embodiments, at least two of the channels (4k) run axially parallel (axially) and are offset in relation to each other. It is quite particularly preferred for all the channels (4k) to run axially and to be offset in relation to one another in such a way that baffle areas are produced between them. The channels generally have a U-shaped cross section, but may also have some other cross-sectional shape and be, for example, V-shaped, annular or rectangular. The channels (4k) may differ from one another in their depth and width.

The second region of the mixing ring is adjoined by a third region. In the third region the mixing ring has an inside diameter which is large enough for it to be able to overlap with the smaller diameter region of the end ring. Depending on whether the smaller diameter region of the front ring aid the region of the end ring are of the same size or have the same shape, the first and third regions (i.e. the two outer regions) of the mixing ring are likewise of the same size and the same shape. Otherwise, they are different.

According to the invention, the mixing ring is so long that, in its respective end positions, the other of the two rings (1) or (2) respectively is partially overlapped. This means that, if one of its end faces terminates with a positive connection with one of the two rings (2) or (3), the other of the two rings (2) or (3) respectively is overlapped partially, to be precise in each case in its region of smaller diameter, respectively. The length of the mixing ring is generally from A minus 3% to A minus 20%. The length of the mixing ring preferably lies in the range from A minus 6% to A minus 12. Of the overall length of the mixing ring, the second or middle region generally takes up from 20 to 70% and the two outer regions together take up from 30 to 60%. The first and second regions may be of the same length. It is also possible for the first and second regions to be of different lengths. According to a preferred embodiment, the first and second regions are of the same length.

The mixing device according to the invention is preferably used in a screw machine, in this respect preferably in single-screw machines. According to one embodiment, the mixing ring terminates with the end ring with a positive connection. This embodiment is particularly preferred whenever the mixing device according to the invention is used as the mixing element in an extruder. According to another embodiment, the mixing ring is displaced axially between the front ring and the end ring. This embodiment is particularly preferred whenever the device according to the invention is used in the manner of a non-return valve, in particular for injection-molding machines.

The mixing device according to the invention is suitable for mixing viscous material with additives. By means of the device according to the invention, viscous materials can be mixed by dividing them up into small volume units in the axial direction. The mixing device according to the invention preferably comprises baffles, which are produced for example by the channels (4k) of the mixing ring being arranged offset in relation to one another. The mixing effect of the mixing device according to the invention is assisted by the presence of mixing zones, which have a constant size and may be enclosed by mixing zones of variable size. The latter may be produced by the mixing ring moving axially. The device according to the invention can be produced easily and at low cost and can be easily cleaned on account of the absence of dead zones.

In particular, the mixing device according to the invention is also suitable for thermally sensitive viscous materials. Viscous materials may be understood as meaning thermoplastic polymers, the melt of which can be processed in a screw machine. Apart from these, however, other viscous materials also come into consideration, for example those in the area of building materials, in the area of natural substances, such as food, or in the area of medicinal substances. The type and amount of the additives depend of course on the viscous material which is to be processed.

According to a preferred embodiment, the mixing device according to the invention is used for mixing melts of thermoplastic polymers, including in particular polymers in the field of styrene copolymers, such as styrene-acrylonitrile copolymers (SAN), acrylonitrile-butadiene-styrene copolymers (ABS) or acrylonitrile-acrylate-styrene copolymers (ASA) with additives, in particular colorants. In particular, the mixing device is used for this purpose in connection with a screw tip in the manner of a non-return valve with a mixing effect in an injection-molding machine.

In the case in which the mixing device according to the invention in operated in the manner of a non-return valve in an injection-molding machine, during the injecting operation the mixing ring (4) initially bears against the front ring (2) with a positive connection and a rearwardly sealing effect, so that flowing back of the melt is prevented. After the beginning of the plasticizing operation, the mixing ring moves toward the end ring (3) under the pressure of the melt arriving, which is conveyed by the screw and in which the colorant is still insufficiently distributed. The rotational speed of the mixing ring remains at zero until the mixing ring bears against the end ring with a positive connection. Since the bearing surface, which may for example be the shoulder of the end ring, is generally small, the rotational speed of the mixing ring is generally much lower than the rotational speed with which the injection-molding machine is operated. The melt conveyed by the screw is divided by the front ring into the number of channels (2k) during the plasticizing operation. If the mixing ring bears against the front ring (2) with a positive connection, the melt streams are divided directly into volume elements by openings ($4o_1$) in the mixing ring. The melt streams then impinge for example against baffles (4p) of the mixing ring, which are produced by the channels (4k) of the mixing ring being arranged offset in relation to one another. The melt streams are mixed in the mixing zones (4m), further distributed through the openings ($4o_2$) and pass at the end of the openings ($4o_2$) into a further mixing space (3m). From there, the melt is divided once again by the channels (3k) of the end ring. If the mixing ring moves toward the end ring, a mixing space (2m) is produced between the front ring and the mixing ring. This becomes larger as the movement of the mixing ring proceeds. At the same time, the mixing space (3m) which lies between the end ring and the mixing ring becomes smaller and is no longer present when the mixing ring bears against the end ring (3) with a positive connection. In this case, the melt which leaves the openings ($4o_2$) in the mixing ring is divided directly into volume elements by the channels (3k) of the end ring.

In principle, any screw tip which allows the melt to leave into the front space can be used as the screw tip.

The mixing device according to the invention has the particular advantage that its mixing effect is substantially independent of the length of the device. Its mixing effect can be influenced in particular by the number and cross-sectional shape of the channels. In general, the mixing device according to the invention has a length which does not exceed 1.8 D, but is preferably not longer than up to 1.5 D, in particular up to 1.2 D, D being defined as the diameter of the screw.

An exemplary embodiment of the mixing device according to the invention is schematically explained in more detail in the drawings, in which;

FIG. 1:

shows a view of a mixing device according to the invention in the manner of a non-return valve during the injection operation (i.e. in the closed position) in conjunction with a screw tip 2 front ring
2k channel in the front ring for distributing the melt
3 end ring
3k channel in the end ring for distributing the melt
3m mixing space between end ring and mixing ring
3s shoulder, transition from the region $3b_2$ to the region $3b_1$,
4 mixing ring
4k channel in the mixing ring for distributing the melt
4m mixing space in the mixing ring
4p baffle
5 screw tip

FIG. 2:

shows a view of a mixing device according to the invention in the manner of a non-return valve during the plasticizing operation (i.e. in the conveying position) in conjunction with a screw tip 1 shaft
1k channel running around the shaft
2m mixing space between front ring and mixing ring
2s shoulder, transition from the region $2b_2$ to the region $2b_1$
5 screw tip
A distance between the front ring and the end ring

FIG. 2A

Detail X of FIG. 2
2 front ring
4 mixing ring

FIG. 3;

shows a plan view of a screw tip which can be connected to the device according to the invention
5 screw tip

FIG. 4 shows a view of individual parts of a mixing device according to the invention

FIG. 4A;

view of a shaft with screw tip
1 shaft
1k channel running around the shaft
1h mounting device for front ring
3 end ring (connected to screw tip)

FIG. 4B.

Figure 4A:
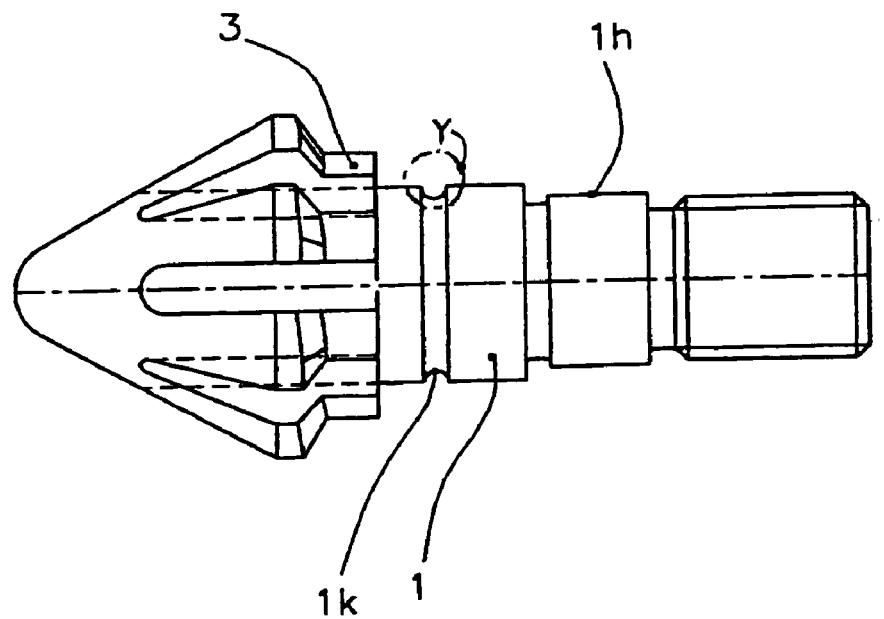
FIG. 4A is a side elevational view of the shaft shown in FIGS. 1-2.
Figure 4C:
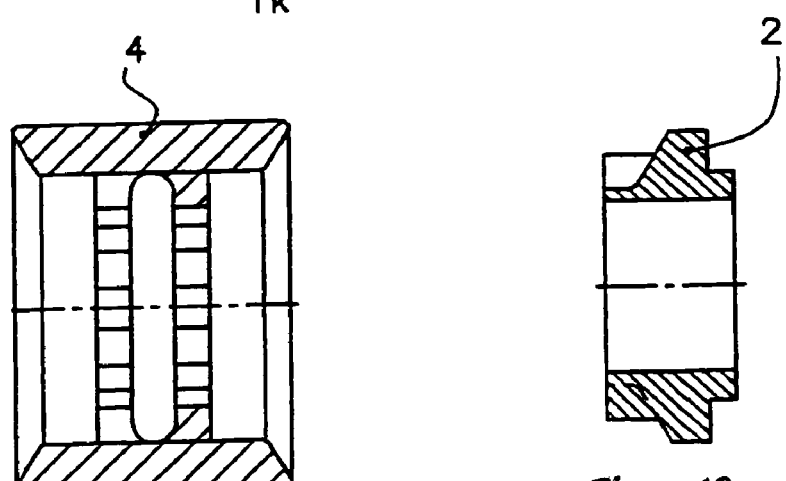
FIG. 4C is a cross-sectional view of the mixing ring shown in FIGS. 1-2.
Figure 4D:
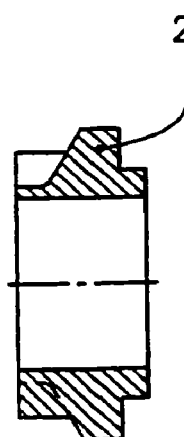
FIG. 4D is a cross-sectional view of the front ring shown in FIGS. 1-2.
Figure 5:
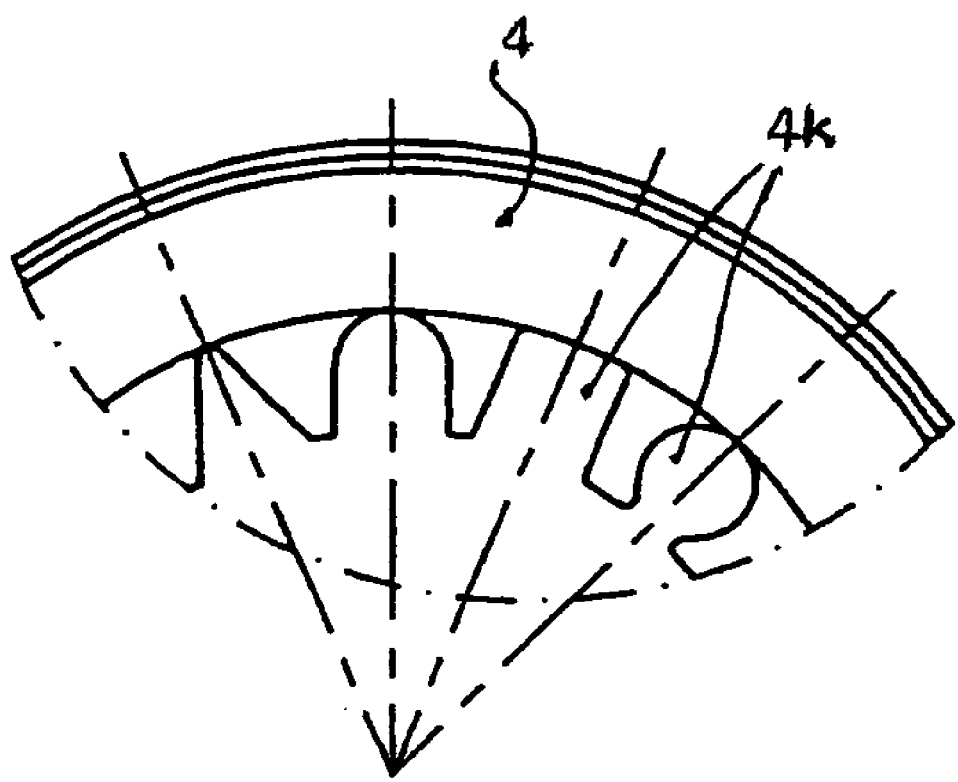
FIG. 5 is a plan view of a portion of the mixing ring shown in FIGS. 1-2 and 4C.
Figure 6:
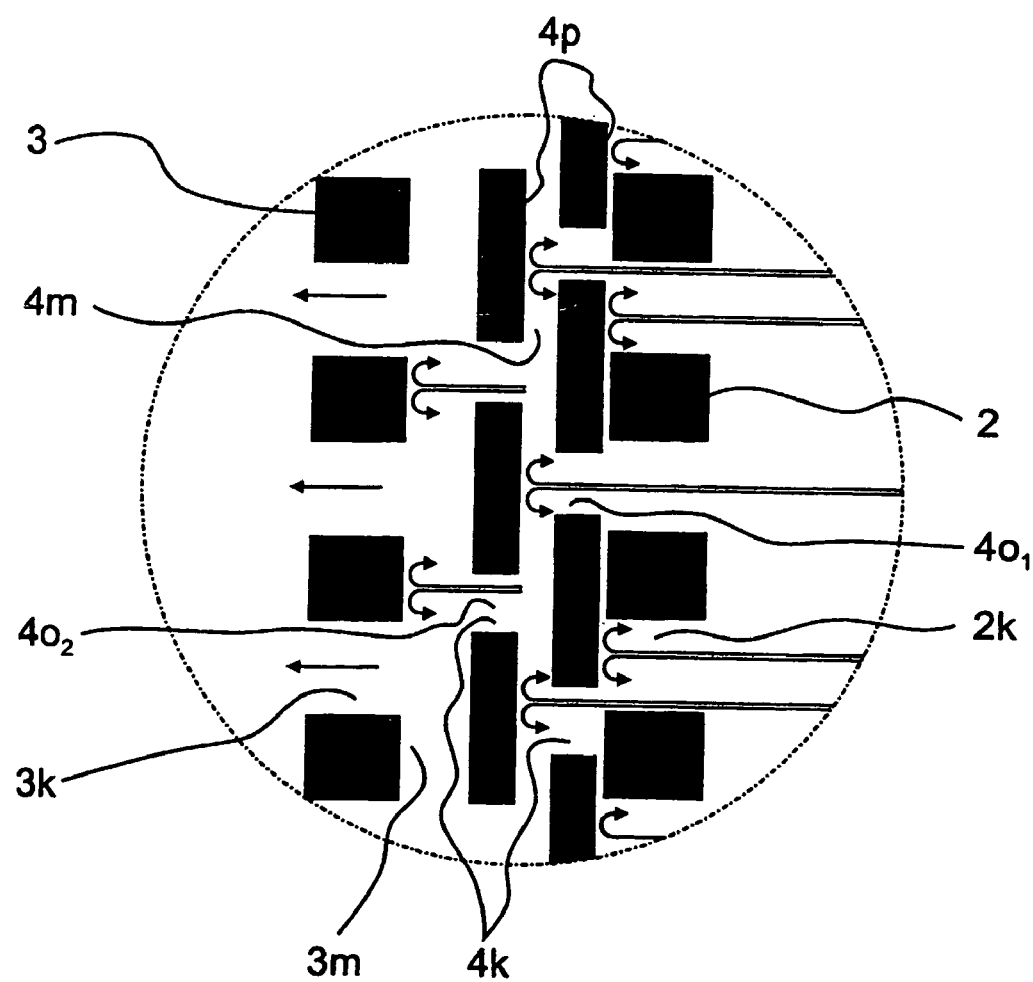
FIG. 6 is a schematic representation of the flow paths through the mixing device of this invention.

Detail Y of FIG. 4A, modified to show smooth surface of shaft (1)

FIG. 4C:

section through a mixing ring (4)

FIG. 4D:

section through a front ring (2)

FIG. 5 shows a plan view of a mixing ring 4 (partial view), which has channels 4$k$ of different cross-sectional shapes

FIG. 6 shows a schematic representation of the dividing of the viscous material as it passes through a mixing device according to the invention (mixing ring is bearing against front ring, i.e. injection operation)

2 front ring
2$k$ channel in the front ring
4$k$ channel in the mixing ring
4$m$ mixing zone
$4_{01}$ opening
$4_{02}$ opening
4$p$ baffle
3 end ring
3$k$ channel in the end ring
3$m$ mixing space

We claim:

1. A mixing device comprising a shaft (1), a front ring (2) and an end ring (3) connected to the shaft at a distance A from each other, and a loose mixing ring (4), which is freely rotatable and can be moved back and forth between the front ring and the end ring, wherein the front ring and the end ring in each case have at least one channel (2$k$) or (3$k$), respectively, which runs axially parallel, at an angle in relation to the axis of the shaft or helically, and has in each case at least two regions of different outside diameters, of which the region with the smaller outside diameter is respectively located on the side facing the mixing ring, and the mixing ring has a first region in which its inside diameter is large enough for it to be able to overlap with the region of smaller diameter of the front ring, has an adjoining second region, and also an adjoining third region, in which its inside diameter is large enough for it to be able to overlap with the region of smaller diameter of the end ring and the mixing ring is so long that, in its respective end positions, the other of the two rings (2) or (3) respectively is partially overlapped, characterized in that the mixing ring has on its inner side of the second region at least two channels (4$k$) which run axially parallel and are arranged offset in relation to each other, and the mixing ring further comprising spaced baffles arranged in the at least two channels.

2. The device as claimed in claim 1, wherein the shaft has a smooth surface on the section between the front ring and the end ring.

3. The device as claimed in claim 1, wherein the shaft has at least one circumferential channel (1$k$) on the section between the front ring and the end ring.

4. The device as claimed in claim 1, wherein the device can be connected on both sides to an adjacent device selected from the group consisting of a screw tip, a kneading element, a conveying element, a venting element and a feed zone.

5. The use of the device as claimed in claim 1 as a mixing element in a screw machine.

6. The use of the device as claimed in claim 5 in connection with a screw tip (5).

7. A screw machine, comprising at least one device as claimed in claim 1.

8. An injection molding machine including at least one mixing device as claimed in claim 1.

9. The device as claimed in claim 1, wherein the mixing ring includes spaced baffles in all of the mixing ring channels.

* * * * *